July 17, 1928.

D. A. BOWEN

CONNECTER

Filed Sept. 28, 1923

WITNESSES:

INVENTOR
Dudley A. Bowen
BY
ATTORNEY

July 17, 1928.
D. A. BOWEN
1,677,326
CONNECTER
Filed Sept. 28, 1923
2 Sheets-Sheet 2
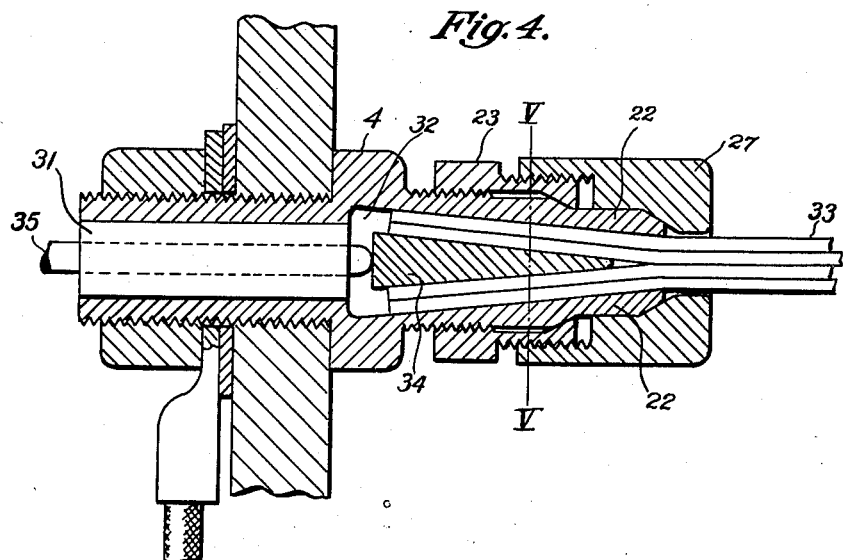
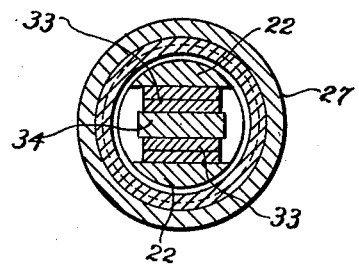
INVENTOR
Dudley A. Bowen Patented July 17, 1928.

1,677,326

UNITED STATES PATENT OFFICE.

DUDLEY A. BOWEN, OF NEW YORK, N. Y.

CONNECTER.

Application filed September 28, 1923. Serial No. 665,371.

My invention relates to connecters and particularly to connecters for joining the ends of current-carrying bus-bars or cables of circular, square or rectangular cross-section and for connecting the bus-bars or cables to fixed terminals, such as are mounted on switchboards and like panels or for outdoor applications on substations, towers or similar structures.

Connecters well known in the art have a socket member for receiving the end of a conductor, the socket being split longitudinally to constitute a plurality of flexible clamping jaws that are forced into engagement with the conductor or cable by means of a threaded nut which engages a tapered exterior surface of the socket.

One object of my invention is to provide a connecter for conductors wherein the gripping characteristics are improved over those of the above-described form of connecter and wherein the cables are so securely attached to the connecter that they do not become loosened by excessive strains or as a result of whipping of the conductors or other vibratory movements thereof.

Another object of my invention is to provide a connecter wherein the clamping nuts serve to lock one another upon the connecter and thereby insure a firm grip upon the connecter under the most severe operating conditions.

These and other objects, that will be made apparent throughout the further description of my invention, are attained by means of the apparatus hereinafter described, and illustrated in the accompanying drawings, wherein Figure 1 is an elevational view of a connecter embodying features of my invention, showing parts thereof in longitudinal section, the connecter being adapted for attaching a conductor to a switchboard terminal;

Fig. 4 is a logitudinal sectional view of a modified form of connecter, and

Fig. 5 is a transverse section taken on the line V—V of Fig. 4.

Figure 1:
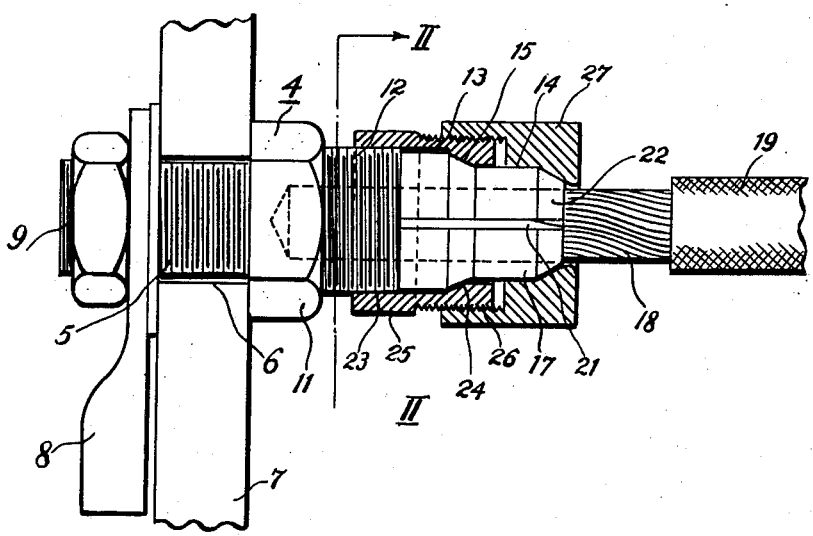
Figure 2:
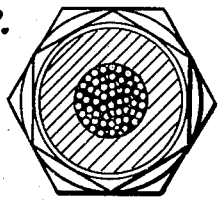
Fig. 2 is a section through the connecter taken on the line II—II of Fig. 1.

Referring to the drawings, and particularly to the construction shown in Fig. 1, the device includes a metal terminal stud 4 having a threaded shank 5 that extends through an opening 6 in an insulating panel or switchboard 7. A tang-and-socket terminal 8 is connected to the shank 5 by means of a threaded nut 9 which securely clamps a hexagonal enlargement 11 of the connecter in engagement with the panel 7. The connecter is also provided with a threaded shank 12 having portions 13 and 14 of reduced diameter, the surface between the sections 13 and 14 converging from the former to the latter to constitute a frusto-conical or tapered seat 15. The end of the portion 14, which is of less diameter than the portion 13, is tapered to constitute a frusto-conical or tapered seat 16 at the extreme end of the shank 12.

The shank 12 is provided with a bore 17 that constitutes a socket for receiving the bare end 18 of an insulated cable 19 which may be of any preferred construction. The shank 12 is further provided with a plurality of longitudinal slots 21 that extend inwardly from the end to a point adjacent to the threaded portion of the shank 12 to constitute a clamp having a plurality of flexible conductor gripping jaws 22 which securely grip the cable when the jaws are pressed inwardly. In the present construction four jaws are provided.

An internally-threaded nut 23, that is screwed upon the shank 12, is provided with a tapered seat 24 that engages the tapered seat 15 on the shank 12 when the nut is rotated on the shank. The nut 23 is provided with a non-circular enlargement 25 preferably of hexagonal form for receiving a wrench in order that it may be screwed tightly upon the threaded portion of the shank 12. When the nut 23 is tightened upon the shank, the tapered seat 24 of the nut engages the tapered seat 15 and forces the jaws 22 into engagement with the conductor.

In order to augment the gripping connection of the nut 23, the nut is provided with an externally-threaded portion 26 for receiving a threaded nut 27 which is provided with a tapered seat 28 for engaging the tapered seat 16. This nut serves to force the extreme end of the jaws 22 into engagement with the conductor or cable when tightened upon the nut 23. The nut 27 is hexagonal or non-circular in form for receiving a wrench for securely tightening the nut.

Should tightening action of the nut 27 compress the jaws 22 to such an extent that the seat 15 is loosened from the seat 24, further rotary movement of the nut 27 will tend to cause the rotation of the nut 23. In this manner, the nuts may be simultaneously tightened or they may be alternately rotated until the desired degree of compression is obtained.

The nut 27 serves to lock the nut 23 in clamping position in such manner that it will not become loosened under the most severe service conditions. It has been found possible to secure considerably greater gripping action with a double nut construction than has heretofore been possible with a construction using a single nut.

Figure 3:
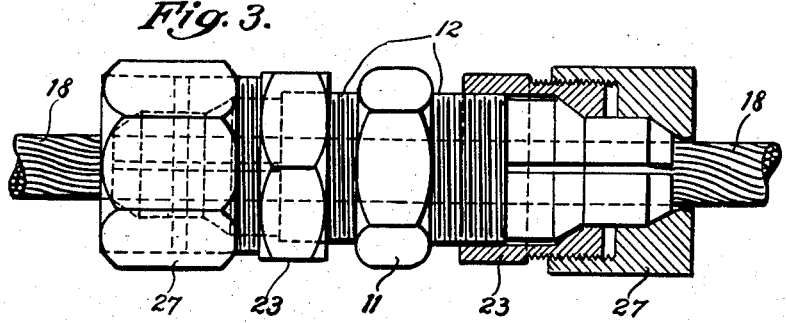
Fig. 3 is an elevational view of a connecter for connecting the ends of the conductors, certain parts of the device being shown in longitudinal section.

In Fig. 3, I have shown a modified form of connecter wherein the shanks 12 on opposite sides of the hexagonal enlargement 11 are identical in construction and serve to connect the ends of two separate cables or conductors 18. The construction of the shanks is identical with the construction of the shank 12 shown in Fig. 1, and the locking nuts 23 and 27 function in the same manner as those herein described.

In order to connect the conductors 18, the hexagonal enlargement 11 is gripped in a wrench and held stationary while the nuts 23 and 27 are being tightened upon the shanks 12.

The parts constituting the connecter are of such nature that they are inexpensive to manufacture and may be applied for clamping conductors thereto with a minimum of effort. By reason of the double clamping-nut construction, it is possible to so securely clamp the conductors to the connecter that no solder is necessary to secure the firm connection required in severe service.

In Figs. 4 and 5 I have shown a modified form of connecter wherein the threaded terminal stud 4 is similar exteriorly to the terminal stud illustrated in Fig. 1, but wherein the interior of the stud is provided with a longitudinal bore 31 which extends inwardly from the rear end of the stud and terminates in a frusto-conical recess 32 which may be of any preferred cross section, depending upon whether the connecter is to be used for conductors of circular cross section, or polygonal cross sections, or for conductors made up of a plurality of flat straps 33 such as are illustrated in Fig. 4.

In order to connect a plurality of flat conductor straps 33 to the connecter stud 4, it is necessary first to loosen the clamping nuts 23 and 27 to permit separation of the clamping jaws 22 sufficient distance to allow the conductor straps 33 to be inserted in the recess 32. A metal wedge 34 is then inserted between the innermost straps and driven toward the front end of the connecter by means of a suitable tool 35 that may be inserted through the bore 31. The wedge 34 expands the strap conductors into engagement with the inclined walls of the recess 32. The nuts 23 and 27 are then successively tightened, in order to firmly press the jaws 22 into engagement with the strap conductors 33. This form of connecter insures a tight connection of the connecter to the conductor and no solder is necessary to retain the parts in assembled relation.

While I have illustrated in Fig. 4 a modified form of connecter adapted particularly for attaching the connecter to strap conductors, it is obvious that a wedge or cone of circular cross section may be substituted for the flat wedge where it is desired to clamp the strands of a cable conductor within the connecter. In this case, the tapered bore 22 should be made to conform in cross section to that of the cable.

While I have illustrated and described several embodiment of my invention, it will be apparent to those skilled in the art that various modifications, changes, substitutions, additions and omissions may be made in the apparatus illustrated without departing from the spirit and scope of my invention, as set forth in the appended claims.

I claim as my invention:

1. The combination with a connecter for a rod-like member, said connecter having a tubular socket member for receiving the said member and provided with movable clamping jaws, of plural cooperating means adjustably connected to the socket member and independently operable for engaging the same clamping jaws at different points axially thereof and for moving them into clamping engagement with the said rod-like member.

2. The combination with a connecter for a rod-like member, said connecter having a tubular socket member for receiving the said member and provided with externally tapered clamping jaws, of plural means adjustably connected to the socket member and independently operable in the same longitudinal direction for engaging the tapered portion of the same jaws at different points axially thereof and for moving them into clamping engagement with the said rod-like member.

3. The combination with a connecter for a rod-like member having a tubular socket member, said connecter for receiving the said member threaded externally and provided with tapered clamping jaws, of a pair of independently operable clamping nuts having threaded co-operative engagement and adapted to engage separate points on the same tapered jaws for moving them inwardly against the said member, one of the said nuts having threaded engagement with the socket member.

4. A connecter comprising a tubular socket member threaded exteriorly and provided with a plurality of axially aligned tapered surfaces of different diameter and slotted longitudinally for rendering the walls of the tube flexible, a nut threaded externally and internally for threaded engagement with the member and having a tapered seat for engaging one of the said tapered seats, and an internally threaded nut for threaded engagement with the external threads on the first nut and having a tapered seat for engaging another of the said tapered seats.

5. The combination with a connecter for a rod-like member, said connecter having a longitudinal bore therethrough, an inwardly flaring socket in said connecter for receiving the said member and clamping jaws for engaging the member, of a wedge adapted to be driven from the rear end of the connecter for expanding the said member into engagement with the walls of the socket and means exterior to the connecter for moving the said clamping jaws into engagement with the rod-like member.

6. The combination with a connecter for a rod-like member having a tubular socket member, said connecter for receiving the said member and provided with a single set of integral movable clamping jaws, of plural cooperating means adjustably connected to the socket member and independently operable for engaging the said clamping jaws at different points axially thereof and for moving them into clamping engagement with the said rod-like member.

In testimony whereof, I have hereunto subscribed my name this 19th day of September, 1923.

DUDLEY A. BOWEN.